United States Patent [19]

Streck

[11] Patent Number: 5,278,545
[45] Date of Patent: Jan. 11, 1994

[54] BACKLIT LCD DISPLAY PANELS INCLUDING SENSIBLE PANELS FOR PEN-DRIVEN COMPUTERS

[75] Inventor: Donald A. Streck, Kailua, Hi.

[73] Assignee: Showa Hatsumei Kaisha, Ltd., Kailua, Hi.

[21] Appl. No.: 897,259

[22] Filed: Jun. 11, 1992

[51] Int. Cl.⁵ ............................................. G09G 3/36
[52] U.S. Cl. .................... 345/102; 359/48; 345/104
[58] Field of Search .................. 340/712, 784, 815.31; 359/48

[56] References Cited

U.S. PATENT DOCUMENTS

| | | | |
|---|---|---|---|
| 4,263,594 | 4/1981 | Masucci | 340/815.31 |
| 4,330,813 | 5/1982 | Deutsch | 340/784 |
| 5,008,658 | 4/1991 | Russay | 340/784 |
| 5,016,956 | 5/1991 | Gasparaitis | 359/48 |
| 5,075,789 | 12/1991 | Jones | 359/48 |
| 5,153,386 | 10/1992 | Siefer | 340/712 |

Primary Examiner—Alvin E. Oberley
Assistant Examiner—Minsun Oh
Attorney, Agent, or Firm—Donald A. Streck

[57] ABSTRACT

A combined backlighting panel, position determination system, and display for use in pen-driven computer systems. There is a panel of a transparent material divided into a plurality of illumination areas. Each of the illumination areas comprises a lensing structure on the bottom surface of the panel for directing entering light towards the top surface of the panel over the associated illumination area. A plurality of light-emitting diodes are disposed to direct light into the lensing structure of respective ones of the plurality of illumination areas. A substrate carries the grids of a digitizer tablet as well as the light emitting diodes. The panel is disposed on the substrate with the bottom surface adjacent the substrate. A display panel is disposed over the top surface of the panel.

2 Claims, 7 Drawing Sheets

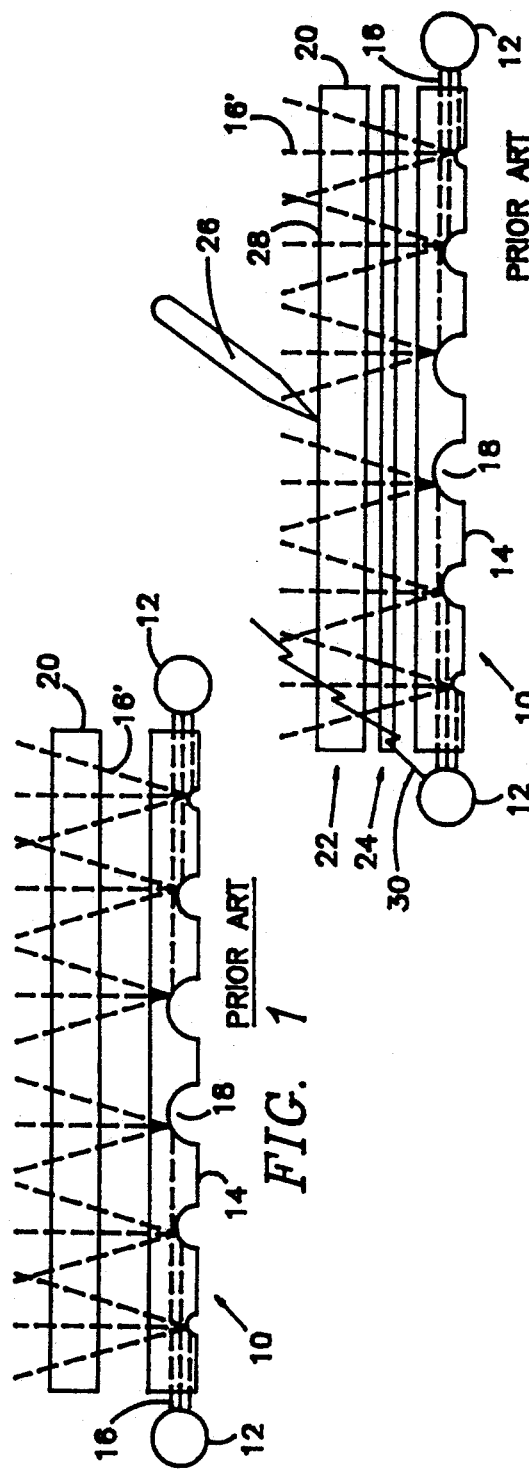

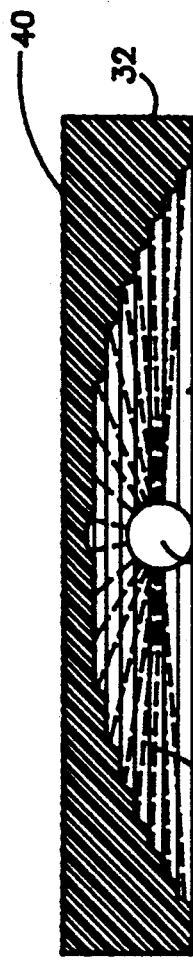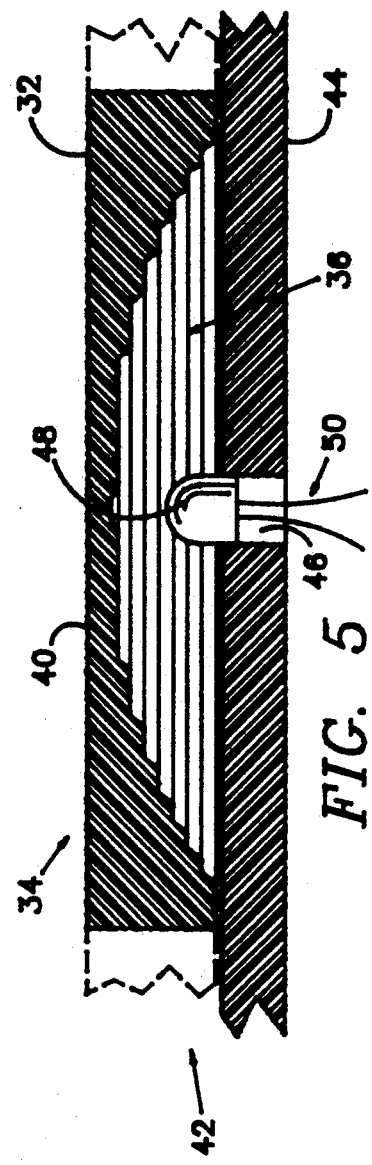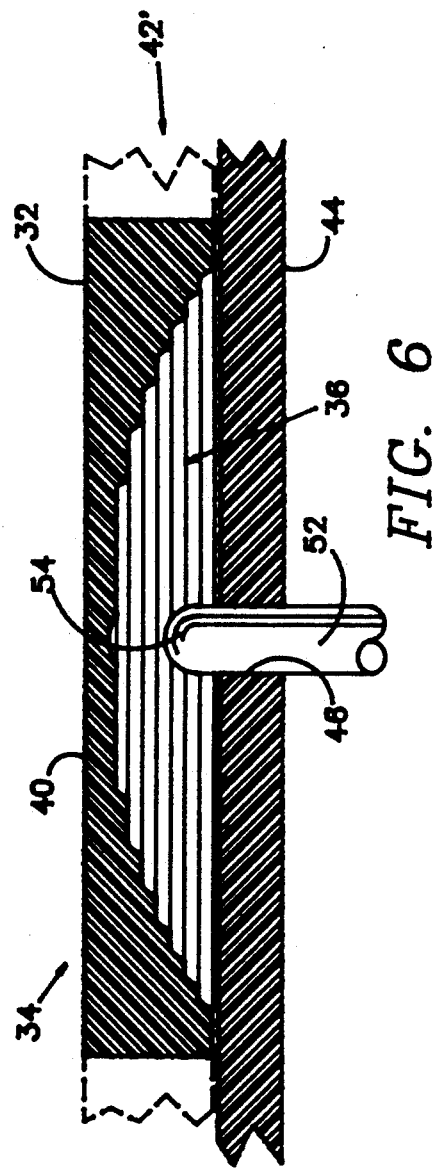

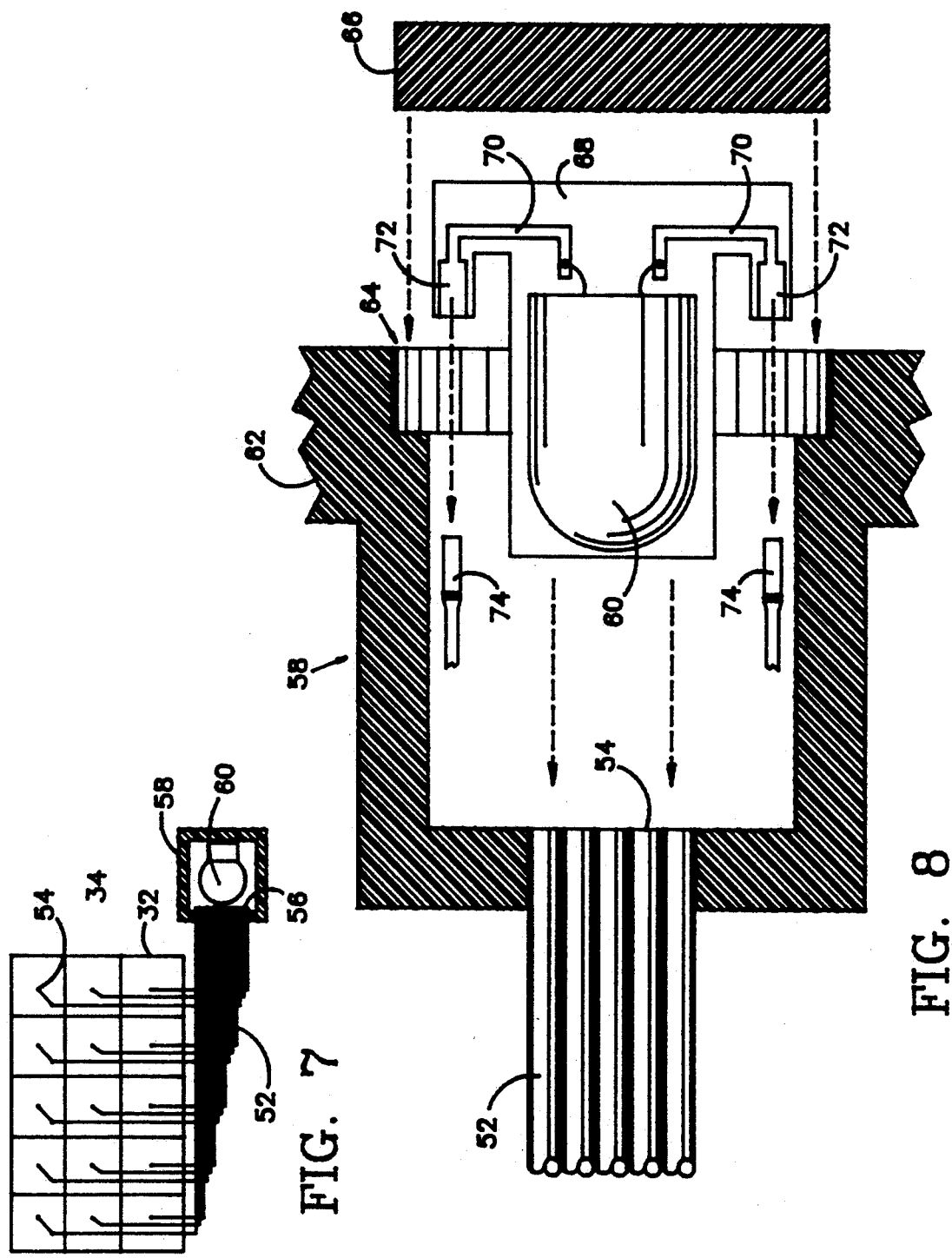

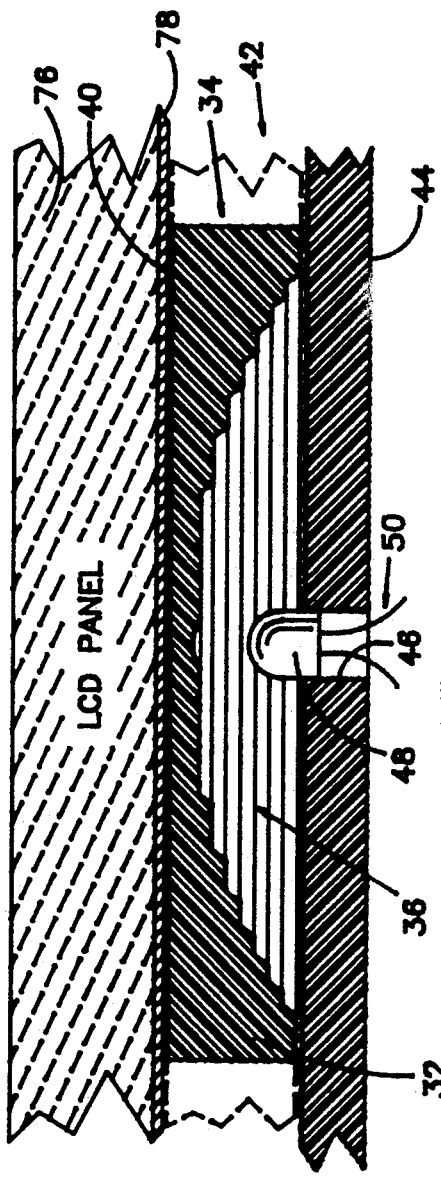
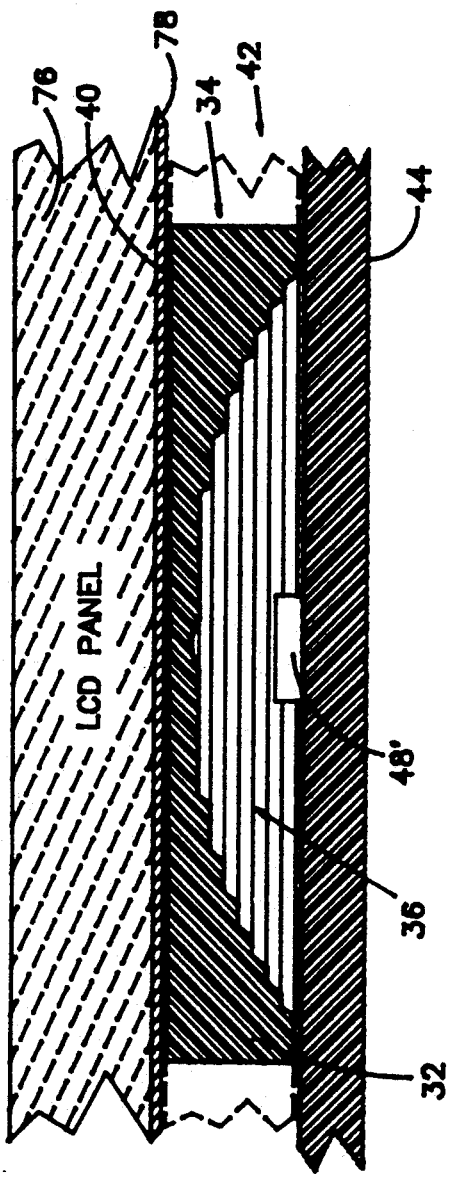

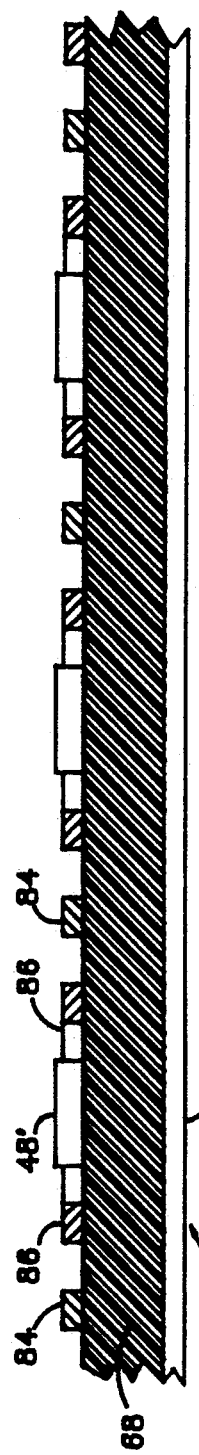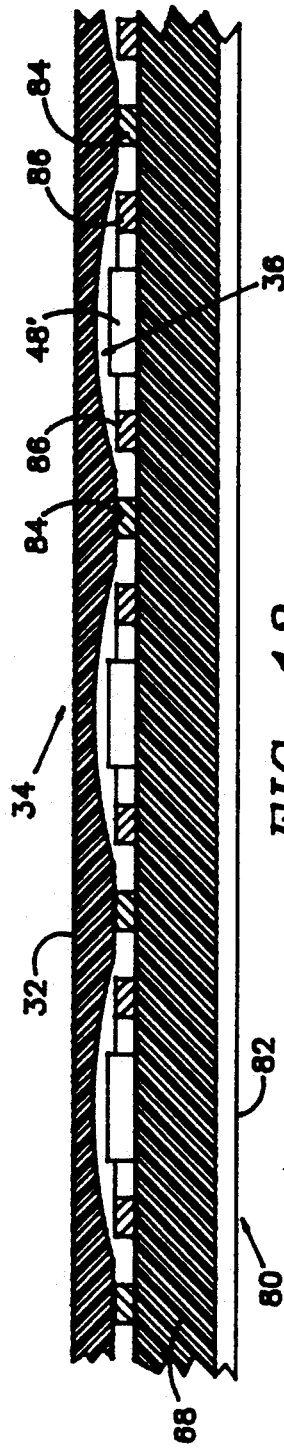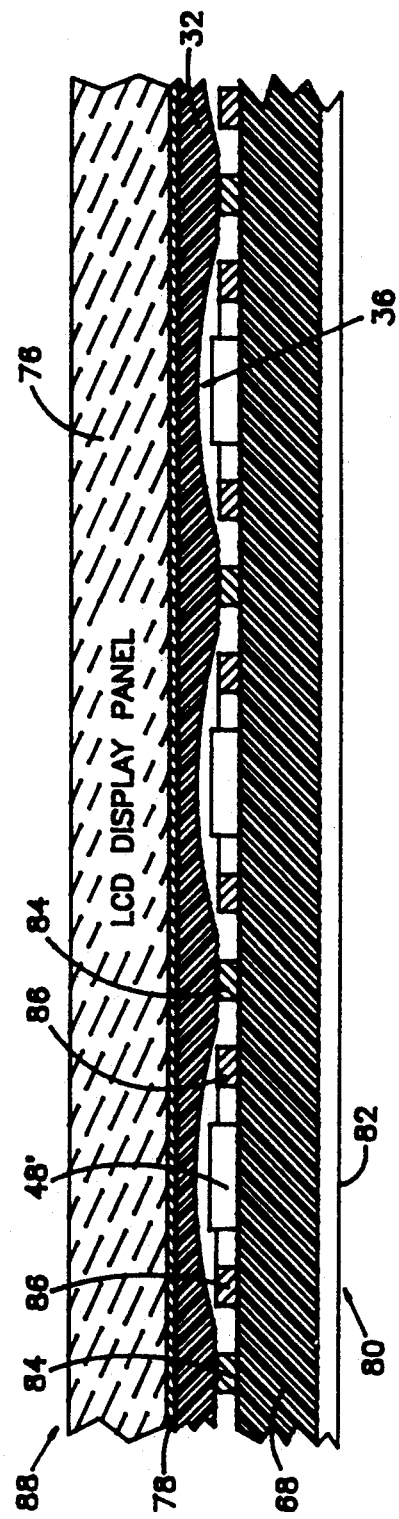

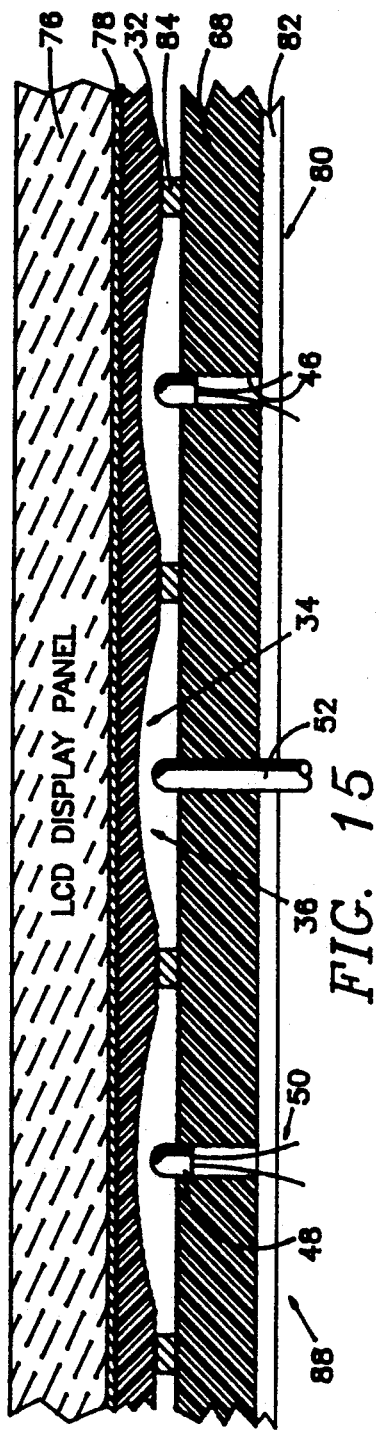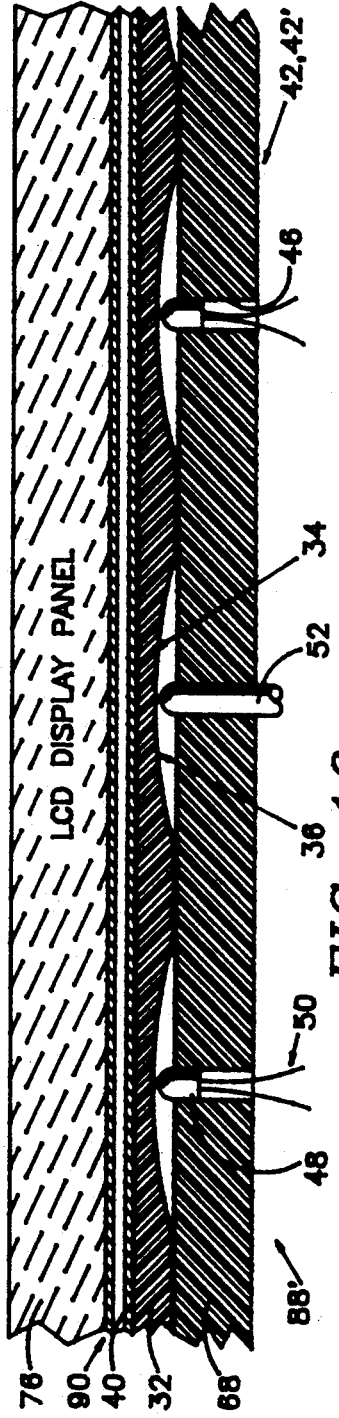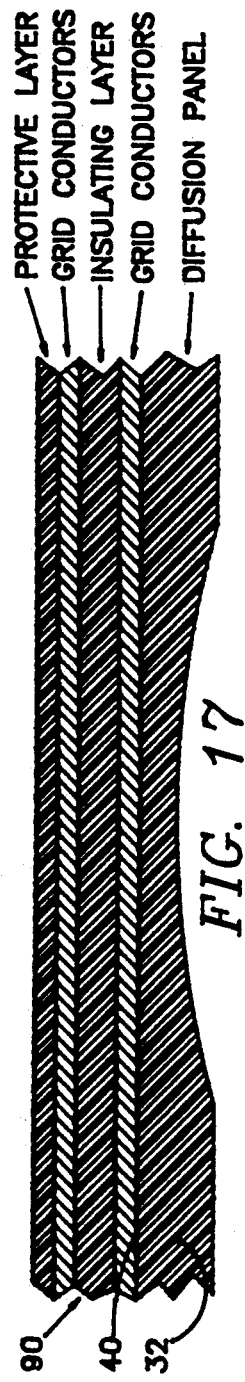

BACKLIT LCD DISPLAY PANELS INCLUDING SENSIBLE PANELS FOR PEN-DRIVEN COMPUTERS

BACKGROUND OF THE INVENTION

This invention relates to displays for electronic devices and, more particularly, to apparatus for backlighting liquid crystal display screens, and the like. The invention also relates to stand-alone backlighting apparatus, and backlighting apparatus incorporated into display panels, digitizing tablets, and sensible display panels.

Electronic devices quite often include a display screen for providing the user with information about the device and its operating functions. Sometimes, it is only a few digits as in the case of a calculator. Often, the display is a large alpha-numeric and graphics display such as employed with laptop, notebook, and other personal computing devices. When power is no object, the display can be of a kind that is self-illuminating. When power is a consideration, however, the display is very often of the liquid crystal type which consumes very low power. A liquid crystal display (LCD) uses polarization techniques to block or pass light through the pixel positions of the display. Thus, unless there is a backlighting system associated with the LCD, incident light must be reflected back through the LCD in order for the displayed information to be visible. Also, LCDs have a viewing axis or angle at which they provide the best viewing. Early LCDs employed for computer screens in laptop computers were difficult to view except under ideal conditions. If the angle of viewing was even slightly off the viewing axis or the incident light was at a wrong angle, the display was practically unreadable. When the incident light fell below a certain level, the display was unreadable in actuality. The advent of newer LCD materials such as the so-called "twist" screen increased the readability of LCDs; but, it was only a matter of degree. Of course, a reflective LCD is useless in the dark.

The answer to the use of LCDs for computer displays lies in the use of backlighting. In this way, the need for incident light to reflect back through the LCD is eliminated as light from the backlighting panel behind the LCD passes through the LCD, thus making the displayed information visible. A typical backlighting arrangement as employed in laptop and notebook type computers is depicted in FIG. 1. The backlighting panel 10 comprises fluorescent tubes 12 located along opposite edges of a transparent plastic panel 14. The plastic panel 14, as is characteristic of such materials, acts as a light pipe to conduct the light 16 from the fluorescent tubes 12. By putting grooves 18, or the like in the plastic panel 14 at spaced intervals, the grooves 18 are illuminated by the "piped" light 16 thereby causing the panel 14 to glow and emanate light 16' through the LCD 20.

Such fluorescent backlighting panels 10 work substantially for their intended purpose. They do, however, have certain drawbacks. In a cold environment, the tubes 12 hesitate to fluoresce to their full potential and the LCD 20 may appear dark or with dark strobing bands caused by visible standing waves in the tubes 12. The panels 10 are relatively expensive so that if the backlighting panel 10 has to be replaced in whole or in part, it is a costly undertaking requiring that the computer be taken to a repair facility. There are two other factors of a fluorescent backlighting panel as shown in FIG. 2 that contribute to its lack of applicability for more contemporary computers—power consumption and electrostatic emissions.

As depicted in FIG. 2, many devices presently under development replace the prior alpha-numeric keyboard employed for inputting information with a sensible display 22. The sensible display 22 combines the functions of an LCD 20 with a digitizer tablet 24 so that the display 22 functions much like the so-called "light pen" displays of early computers. Thus, to use the display 22, a user employs a pen cursor 26 on the surface 28 of the display 22. The position of the pen cursor 26 can be determined by any of a number of techniques implemented by the digitizer tablet 24 including electro-magnetic sensing, and electrostatic sensing. The sensing according to these techniques typically requires a grid of some sort to be associated with the digitizer tablet 24 of the display 22. If a backlighting panel 10 as described above employing fluorescent tubes 12 is positioned behind the LCD 20 and grids of the digitizer tablet 24, it can cause problems such as those mentioned above related to electrostatic discharges 30 from the fluorescent tubes 12. If the sensing system is an electrostatic type, the spurious electrostatic energy can interfere with the accurate sensing of the cursor 26. Surprisingly, if the sensing is electro-magnetic, the same problem exists. This is particularly true if it is a powered, cordless cursor. In order to save battery power consumption in such a cordless cursor (which is only a small lithium hearing-aid type battery), the signal output level is very low. Thus, there can be interference from the electrostatic discharges 30 from the fluorescent tubes 12. A backlighting approach which did not emit interfering forces of any kind would, therefore, be of definite benefit in product design.

The new pen-driven and personal assistant type of computers are also very power limited. Whereas laptop and notebook computers employ rechargeable and replaceable battery power packs, a design criteria of the personal assistant devices in particular is the ability to run for weeks on end on two or three AAA or AA type alkaline batteries. Because of the power consumption of prior art backlighting schemes, the first personal assistants will most likely employ reflective rather than backlit displays in order to be able to meet this design criteria.

The personal assistant computing devices have other design criteria which also effect the type of display and digitizing (i.e. position sensing) apparatus which is used. Weight is a factor. Even more of a factor is size—both as to length and width, and to thickness. A typical prior art backlit LCD display panel as employed with a prior art laptop or notebook computer can be an inch or more in thickness. This is far to thick for a personal assistant device in which the whole device is intended to be less than an inch in thickness.

Wherefore, it is an object of this invention to provide a backlighting scheme for liquid crystal displays, and the like, which is very low in its power consumption.

It is another object of this invention to provide a backlighting scheme for liquid crystal displays, and the like, which does not emit electrostatic and other interfering energy.

It is still another object of this invention to provide a backlighting scheme for liquid crystal displays associated with computers, and the like, which is easily and inexpensively repaired in the event of failure of the light-emitting source.

It is yet another object of this invention to provide a backlighting scheme for liquid crystal displays, and the like, which can be incorporated into the liquid crystal display structure.

It is a further object of this invention to provide a backlighting scheme for liquid crystal displays, and the like, employed with pen-driven computing devices which can be incorporated into a digitizing tablet associated with the liquid crystal display.

It is a still further object of this invention to provide a sensible backlit display for use with pen-driven computing devices in which liquid crystal display, a backlighting panel, and a digitizing grid are incorporated into one device.

Other objects and benefits of the invention will be recognized and appreciated by those skilled in the art from the detailed description contained hereinafter when taken in conjunction with the drawing figures which accompany it.

SUMMARY

The foregoing objects have been attained by the backlighting panel for displays of the present invention comprising, a panel of a transparent material, the panel being divided into a plurality of illumination areas, each of the illumination areas comprising lensing structure means on a bottom surface of the panel for directing light entering the lensing structure means into the panel towards a top surface of the panel; and, a plurality of light-emitting means disposed to direct light into the lensing structure of respective ones of the plurality of illumination areas.

Preferably, the top surface of the panel is frosted to diffuse light passing therethrough.

In one embodiment, the plurality of light-emitting means comprises a plurality of light emitting diodes. A substrate may carry the plurality of light emitting diodes. In such case, the panel is disposed on the substrate with the bottom surface adjacent the substrate. In one configuration, the substrate has a plurality of bores therethrough and the plurality of light emitting diodes are disposed in respective ones of the bores. In another configuration, the substrate is a printed circuit board and the plurality of light emitting diodes are formed on the substrate.

In another embodiment, the plurality of light-emitting means comprises light-emitting ends of a plurality of optic fibers. In the preferred configuration of this embodiment, a substrate carries the light-emitting ends of the plurality of optic fibers and there are means for inserting light energy into opposite ends of the plurality of optic fibers to emerge from the light-emitting ends. The panel is disposed on the substrate with the bottom surface adjacent the substrate. The means for inserting light energy into opposite ends of the plurality of optic fibers comprises an enclosure having the opposite ends of the plurality of optic fibers communicating with an interior thereof and a light-emitting source disposed within the interior of the enclosure.

In a first combination, there is a substrate carrying the plurality of light emitting means and a portion of detection means for determining a position of a cursor adjacent the substrate carried by the substrate. Again, the panel is disposed on the substrate with the bottom surface adjacent the substrate. The portion of detection means may comprise grid conductors of a digitizing tablet.

In a second combination formed from the first combination, there is a display panel disposed over the top surface of the panel. To provide visibility without backlighting in sufficient ambient light conditions, there is a half-silvered material disposed between the display panel and the top surface of the panel.

DESCRIPTION OF THE DRAWINGS

FIG. 1 is a simplified drawing of a prior art backlighting panel employing fluorescent tubes disposed behind a liquid crystal display.

FIG. 2 shows the liquid crystal display and backlighting panel used in conjunction with a digitizing grid.

FIG. 3 is a plan view of the bottom of a backlighting diffusion panel according to the present invention.

FIG. 4 is a cutaway more detailed view through one illumination area of the backlighting diffusion panel of FIG. 3 showing the general approach of the present invention.

FIG. 5 is a cutaway more detailed view through one illumination area of the backlighting diffusion panel of FIG. 3 showing one way of illuminating the illumination areas.

FIG. 6 is a cutaway more detailed view through one illumination area of the backlighting diffusion panel of FIG. 3 showing another way of illuminating the illumination areas.

FIG. 7 is a simplified drawing depicting the preferred way of illuminating the light pipes of FIG. 6.

FIG. 8 is a detailed cutaway view of the illumination box of FIG. 7.

FIG. 9 is a drawing showing the embodiment of FIG. 5 combined with a liquid crystal display panel.

FIG. 10 is a drawing depicting an alternate way of implementing the approach of FIGS. 5 and 9.

FIG. 12 is a cutaway view through the printed circuit board of FIG. 11.

FIG. 13 is a cutaway view through the printed circuit board of FIG. 12 with a backlighting diffusion panel added thereto.

FIG. 14 is a cutaway view through the printed circuit board and backlighting diffusion panel combination of FIG. 13 with a liquid crystal display panel further added to the combined structure.

FIG. 15 is a cutaway view through a printed circuit board and backlighting diffusion panel employing the light sources of FIGS. 5 and 6 combined with a liquid crystal display panel and grid runs on the printed circuit board.

FIG. 16 is a sensible backlit display as in FIG. 15 according to an alternate embodiment as can be constructed by employing transparent grid runs.

FIG. 17 is a cutaway view through a backlighting diffusion panel according to the present invention having a transparent digitizer grid formed thereon as could be used in the embodiment of FIG. 16.

DESCRIPTION OF SEVERAL PREFERRED EMBODIMENTS

Figure 11:
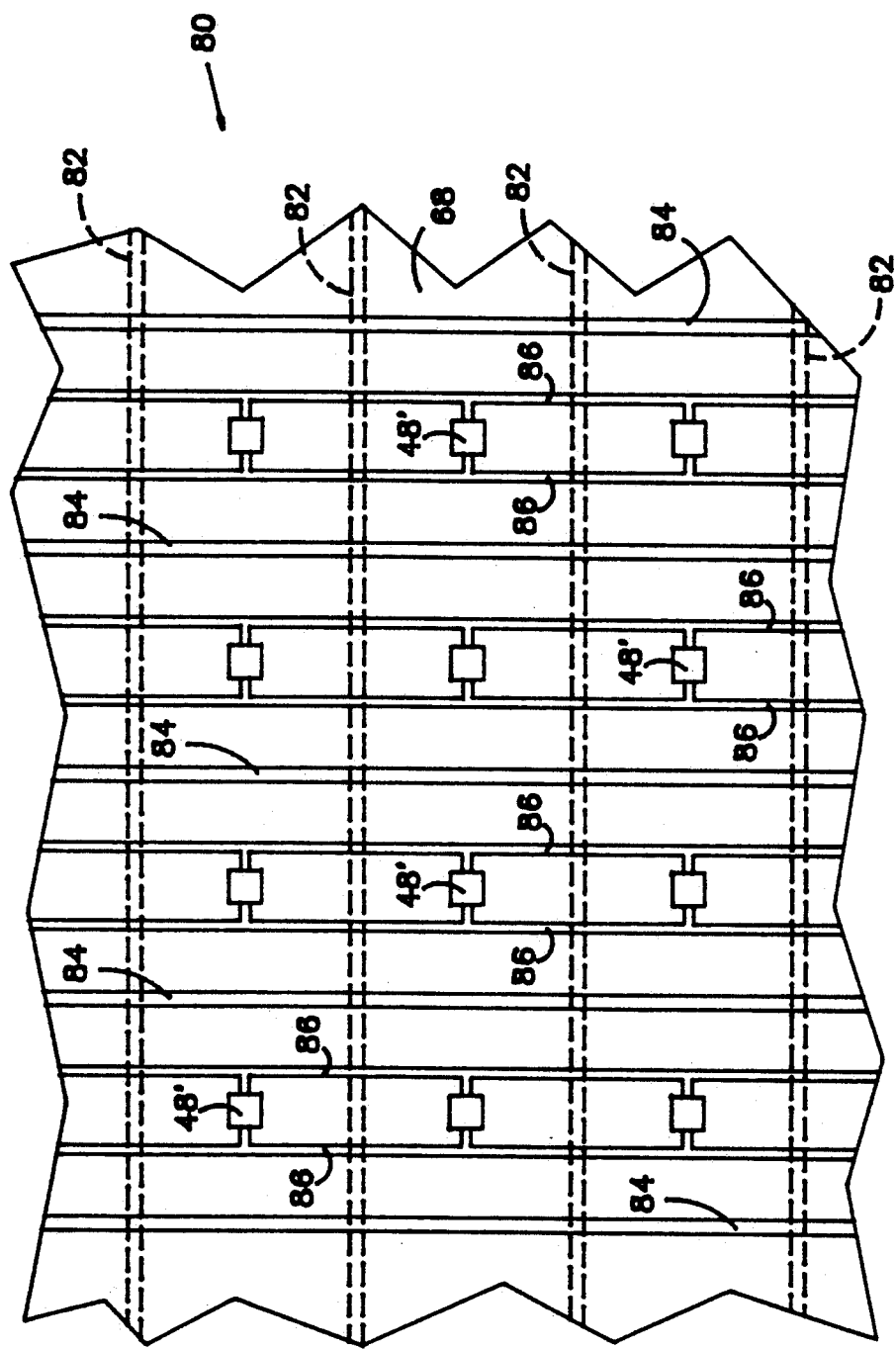
FIG. 11 is a plan view of a digitizing tablet showing how the light emitting diodes of FIG. 10 can be formed on one surface of a printed circuit board along with the connecting run and grid runs.

The basic approach of the present invention is the providing of a number of low power light sources spaced behind the display. The heart of the approach is the backlighting diffusion panel 32 depicted in FIGS. 3 and 4. FIG. 3 shows the bottom of the panel 32 in plan view and represents a panel 32 to be used in association with a 3 inch by 5 inch display for a personal assistant device. The panel 32 is preferably molded of a transparent plastic and is divided into one-square-inch illumination areas 34. The bottom of each illumination area 34 is formed as a lensing structure 36 so that when a light source 38 is placed in the center as depicted in FIG. 4, the light 16 from the source 38 will be refracted by the lensing structure 36 evenly into the illumination area 34. The top surface 40 of the entire panel 32 is frosted to provide diffusion of the light 16 therefrom so as to eliminate or minimize bright areas adjacent the light sources 38 as much as possible.

A backlighting panel 42 according to the present invention can be constructed in several ways. As depicted in FIG. 5, a printed circuit board (PCB) 44 can have bores 46 therethrough located at the centers of the lensing structures 36. Individual light emitting diodes (LEDs) 48 can then be disposed in the bores 46 with the connecting wires 50 thereof connected to a source of power. A backlighting diffusion panel 32 placed over the PCB with the LEDs 48 positioned at the centers of the lensing structures 36 completes the backlighting panel 42 as depicted in the drawing figure. An alternate approach is depicted in FIG. 6. In this case, the backlighting panel 42' is the same as in FIG. 5 with the exception that the LEDs 48 are replaced with optic fibers 52 of plastic or glass having light disbursing ends 54 thereof positioned in the bores 46.

The illumination approach of FIG. 6 is a preferred approach to a backlighting panel according to the present invention because of its virtually indestructible nature. As will be remembered, a problem with the prior art fluorescent tube backlighting panels is the high cost of repair or replacement if one of the fluorescent tubes burns out. If individual LEDs 48 are used as in the backlighting panel 42 of FIG. 5, it will be understood that if one of the LEDs 48 fails for any reason, there will be an associated dark illumination area 34 of the display. While LEDs are reliable and such a structure should be relatively inexpensive to build in volume, it would still require a service facility to repair the backlighting panel. The approach of FIG. 6 illuminated in the manner of FIGS. 7 and 8 completely virtually eliminates the possibility of the backlighting panel 42' ever failing and, for that reason alone, it is preferred. As depicted in FIG. 7, the optic fibers 52 from the illumination areas 34 are bundled and terminate at their opposite ends 56 in an illumination box 58 disposed in the case of the associated device. The illumination box 58 contains a bulb 60 which, when power is applied thereto, emits light into the ends 56 of the optic fibers 52.

The preferred approach to the illumination box 58 allowing a user to simply, quickly, and inexpensively replace the bulb 60 should it burn out is depicted in FIG. 8. The illumination box 58 is formed into the case 62 of the associated device and has an access opening 64 which is closed with a removable closure 66 in any of several ways well known to those of ordinary skill in the art. The bulb 60 is preferably one of the high intensity so-called Krypton bulbs used in high intensity flashlights which give a high light output at low power consumption. For added convenience, the bulb 60 can be mounted on a PCB 68 where it is electrically connected to conductive runs 70 terminating in edge connectors 72. The edge connectors 72 mate with contacts 74 connected to the source of power for the bulb 60 when the PCB 68 is pushed into the illumination box 58. Thus, it can be seen that the changing of the bulb 60 by a user should it ever be required is simply a matter of buying a replacement, opening the closure 66, pulling out the old bulb's PCB 68, inserting the new bulb's PCB 68, and replacing the closure 66. In other words, replacing the bulb 60 would be as simple as replacing the batteries which power the device. If desired for even further convenience since the user of such devices will be able to replace the batteries using standard AA or AAA batteries, the PCB 68 could be adapted to have a standard flashlight bulb replaceably mounted thereon so that a standard flashlight bulb could be purchased and used to replace the bulb 60 on the same PCB 68 rather than replacing the PCB 68 with a new one containing a new bulb 60.

Having thus addressed two basic ways in which a backlighting panel according to the present invention can be constructed, ways in which the panel can be implemented in combination with other components of a display and/or position determination apparatus will now be addressed. In FIG. 9, the backlighting panel 42 of FIG. 5 is combined with a liquid crystal display (LCD) panel 76. It is preferred that a "half-silvered" reflective material 78 be disposed between the LCD panel 76 and the backlighting panel 42. The term half-silvered as is known in the optical art refers to a very thin layer of reflective material such as aluminum or silver which can be applied by sputtering, vacuum deposition, or the like. It is the basis of the so-called "one-way" mirror. Thus, when there is enough incident light striking the half-silvered reflective material 78 through the LCD panel 76, the backlighting panel 42 is not required and the light is reflected back through the LCD panel 76 by the half-silvered reflective material 78 because the area behind the half-silvered reflective material 78 (i.e. the backlighting panel 42) is dark. When there is not enough incident light striking the half-silvered reflective material 78 through the LCD panel 76 for proper viewing, the backlighting panel 42 (which has been turned off for power conservation) can be turned on. The light from the backlighting panel 42 then passes through the half-silvered reflective material 78 to illuminate the LCD panel 76. As will be readily recognized by those skilled in the art, the half-silvered reflective material 78 can be applied to the surface of the LCD panel 76, to the top surface 40 of the backlighting panel 42, or be on a sheet of mylar, or the like, (which is a commercially available material used to cover windows for heat reflective purposes) disposed between the two.

The same combination is depicted in FIG. 10 with a new implementation of the LEDs. Whereas in the implementations of FIGS. 5 and 9 the LEDs 48 were individual LEDs inserted into the bores 46, in this implementation the LEDs 48' are formed on the surface of the PCB 44 (along with their connecting conductive runs) according to techniques well known to those in the printed circuit and integrated circuit art which form no part of the novelty of this invention.

While one could make a PCB having only the LEDs 48' and their connecting conductive runs thereon, since the primary use for such displays is to be in so-called "pen-driven" devices wherein the input to the computing device is by the sensing of the position of a cursor device on the surface of the display, it is convenient to include the LEDs 48' and their connecting conductive runs as part of a digitizing grid system. Such an approach is depicted in FIGS. 11 and 12. While a single example is depicted, variations thereof will undoubtedly be apparent to those of ordinary skill in the digitizer art as applicable to the particular sensing approach utilized in digitizers with which they are associated. The example depicted in this application is intended for use with a cordless electro-magnetic digitizing system having an active cursor. The combined grid and LED structure 80 comprises a PCB 68 having the conductive runs 82 for one grid direction (e.g. the Y grids) formed on the bottom side thereof. In this regard, the term "top" means that side intended to face the LCD panel 76 and "bottom" means the opposite side. The conductive runs 84 for the other grid direction (e.g. the X grids) are formed on the top side thereof. The LEDs 48' and their connecting conductive runs 86 are formed on the top surface of the PCB 68 between the parallel conductive runs 84. The combined panel 80 of FIGS. 11 and 12 preferably then has a backlighting diffusion panel 32 placed thereover as depicted in FIG. 13.

As those of ordinary skill in the art will readily recognize and appreciate, the LEDs 48' in the combined panel 80 could also be replaced with the LEDs 48 of FIG. 5 or the optic fibers 52 of FIG. 6 in bores 46 through the PCB 68 at the location of the LEDs 48' as depicted in FIG. 15.

As depicted in FIG. 14, the combined panel 80 of FIG. 13 can be combined with a LCD panel 76 and half-silvered reflective material 78 as in FIGS. 9 and 10 to provide a backlit and sensible display 88. Another variation is depicted in FIG. 15. Still another possible construction for a backlit and sensible display 88' according to the present invention is depicted in FIG. 16. In this case, a backlighting panel 42, 42' according to the present invention has a transparent digitizing grid structure 90 as is known in the art disposed between the top surface 40 of the backlighting panel 42, 42' and a LCD panel 76. Typically, the transparent digitizing grid structure 90 is formed by silk-screening transparent conductive runs onto a mylar substrate which must then be supported by a PCB or the like. A very thin structure could be made by silk-screening the transparent conductive runs and intermediate insulating layers directly onto the top surface 40 of the backlighting diffusion panel 32 as shown in the enlarged drawing of FIG. 17.

Wherefore, having thus described the present invention in its various embodiments, what is claimed is:

1. A combined backlighting panel and position determination system for pen-driven computer displays comprising:
    a) a diffusing panel of a transparent material, said panel being divided into a plurality of illumination areas, each of said illumination areas comprising lensing structure means on a bottom surface of said diffusing panel for directing light entering said lensing structure means into said diffusing panel towards a top surface of said diffusing panel and across an associated illumination area;
    b) a plurality of light-emitting diodes disposed to direct light into said lensing structure means of respective ones of said plurality of illumination areas;
    c) a substrate carrying said plurality of light emitting diodes; and,
    d) a portion of detection means for determining a position of a cursor adjacent said substrate comprising grid conductors of a digitizing tablet also carried by said substrate; wherein,
    e) said diffusing panel is disposed on said substrate with said bottom surface adjacent said substrate.

2. A combined backlighting panel, position determination system, and display for pen-driven computers comprising:
    a) a diffusing panel of a transparent material, said diffusing panel being divided into a plurality of illumination areas, each of said illumination areas comprising lensing structure means on a bottom surface of said diffusing panel for directing light entering said lensing structure means into said diffusing panel towards a top surface of said diffusing panel and across an associated illumination area;
    b) a plurality of light-emitting diodes disposed to direct light into said lensing structure means of respective ones of said plurality of illumination areas;
    c) a substrate carrying said plurality of light emitting diodes;
    d) a display panel disposed over said top surface of said diffusing panel; and,
    e) a portion of detection means for determining a position of a cursor adjacent said substrate comprising grid conductors of a digitizing tablet also carried by said substrate; wherein,
    f) said diffusing panel is disposed on said substrate with said bottom surface adjacent said substrate.

* * * * *